(12) United States Patent
Offord et al.

(10) Patent No.: US 7,466,369 B1
(45) Date of Patent: Dec. 16, 2008

(54) PORTABLE PROJECTOR USING A TRANSMISSIVE MICRODISPLAY

(75) Inventors: Bruce W. Offord, San Diego, CA (US); Stephen D. Russell, San Diego, CA (US); Randy L. Shimabukuro, Kapolei, HI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 183 days.

(21) Appl. No.: 11/637,576

(22) Filed: Dec. 12, 2006

Related U.S. Application Data

(63) Continuation-in-part of application No. 10/901,653, filed on Jul. 29, 2004, now Pat. No. 7,253,869, and a continuation-in-part of application No. 10/911,769, filed on Jul. 29, 2004, now abandoned, and a continuation-in-part of application No. 10/911,770, filed on Jul. 29, 2004.

(51) Int. Cl.
*G02F 1/1335* (2006.01)
(52) U.S. Cl. ............................................. 349/5; 349/7
(58) Field of Classification Search ................. 349/5, 349/7
See application file for complete search history.

(56) References Cited

U.S. PATENT DOCUMENTS 7,365,721 B2 * 4/2008 Tanaka et al. ................. 345/87

* cited by examiner

*Primary Examiner*—David Nelms
*Assistant Examiner*—Phu Vu
(74) *Attorney, Agent, or Firm*—Kyle Eppele; Peter A. Lipovsky; J. Eric Anderson

(57) ABSTRACT

A portable micro-display projector uses a light transmissive liquid crystal display system wherein light is projected co-linearly from a light source through, and is selectively altered by, a transmissive liquid crystal display or liquid crystal light valve of the light transmissive liquid crystal display system.

9 Claims, 1 Drawing Sheet

PORTABLE PROJECTOR USING A TRANSMISSIVE MICRODISPLAY

CROSS-REFERENCE TO RELATED APPLICATIONS

This is a continuation-in-part of U.S. patent application Ser. Nos. 10/901,653 now U.S. Pat. No. 7,253,869, 10/911,769 now abandoned and 10/911,770 all filed 29 Jul. 2004. These applications are incorporated by reference herein.

BACKGROUND

The following description relates to electromagnetically transmissive liquid crystal displays and liquid crystal light valves.

Certain micro-projectors are manufactured with reflective liquid crystal on silicon. There are also microdisplays that are micro-electromechanical system (MEMS)-based that require beam-splitters and other optical components for image display. The reflective optics of these approaches require that the light used travel a non-linear path. This makes for a relatively large optics package that is costly to fabricate and maintain and one in which display brightness is attenuated.

There is thus a need for a micro-projector that is compact in size, that is inexpensive to fabricate and maintain, and that projects a relatively bright image.

SUMMARY

A portable micro-display projector uses a light transmissive liquid crystal display system wherein light is projected co-linearly from a light source through, and is selectively altered by, a transmissive liquid crystal display or liquid crystal light valve of the light transmissive liquid crystal display system.

Other objects, advantages and new features will become apparent from the following detailed description when considered in conjunction with the accompanied drawing.

DESCRIPTION

Figure 1:
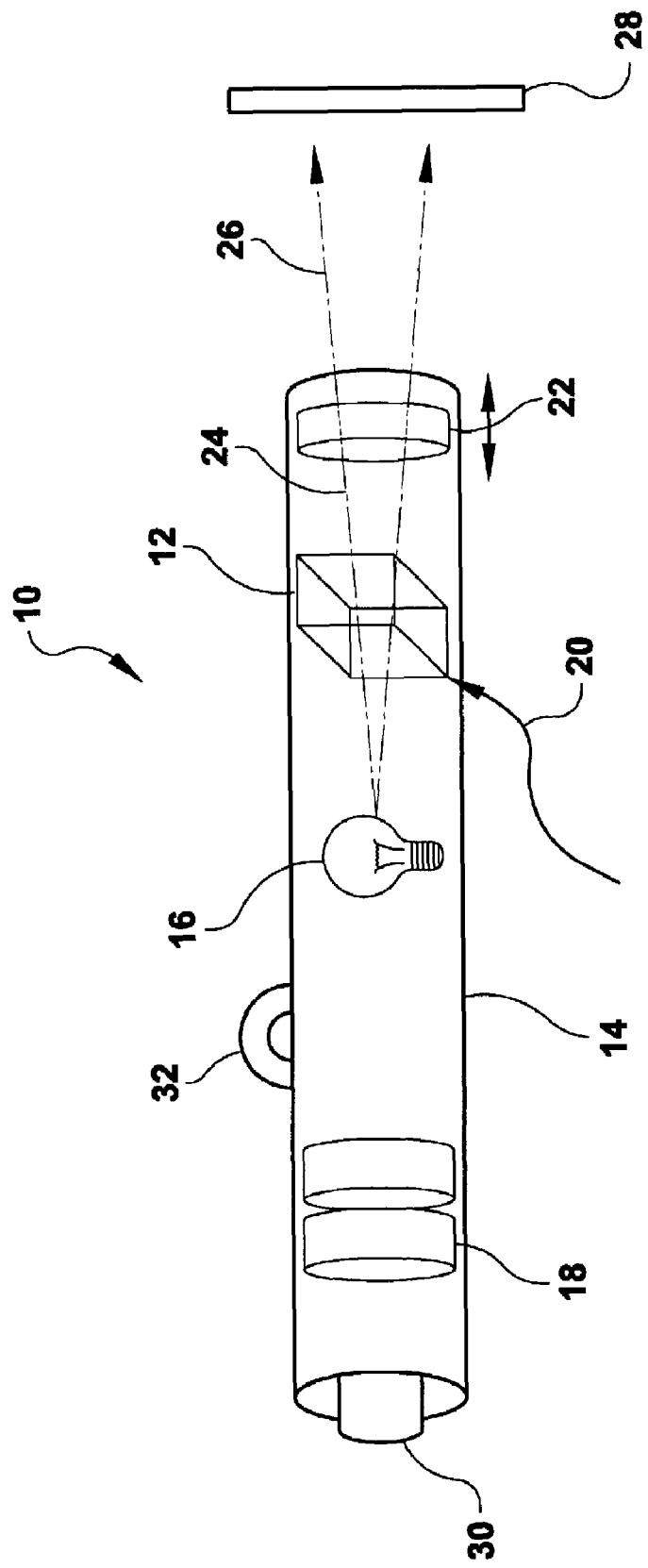
FIG. 1 shows a side perspective view of a representative portable projector according to the description herein.

Referring to FIG. 1, an exemplary portable projector apparatus 10 is shown. Projector 10 utilizes a single-panel transmissive liquid crystal display system 12 (also identified herein as a light valve system). Transmissive liquid crystal display system 12 is a micro-projector that may be made to fit a portable housing 14 having the diameter of a less than about 2.5 centimeters, for example. Transmissive liquid crystal display system 12 allows light to pass linearly through it as well as permits this light to be selectively altered so that a desired image may ultimately be projected from apparatus 10. Light from light source 16 is co-linearly aligned with transmissive liquid crystal display system 12. Light from light source 16 is therefore projected linearly through projector 10, thereby allowing projector 10 to be a pen-sized or cigar-sized projector.

An example of such a transmissive liquid crystal display system is described in U.S. Pat. Nos. 6,521,950 incorporated by reference herein. An example process for manufacturing such a light valve system is described in U.S. Pat. No. 6,617,187, incorporated by reference herein. These patents describe an example display system wherein sapphire is used as a substrate, thereby enabling light to be passed directly through the display of this system.

Within housing 14 of projector 10 is a power supply 18, aforementioned light source 16, transmissive liquid crystal display system 12 having an input signal connection 20 (either wireless or wired), an optical assembly 22 providing an adjustable focus 22 by which selectively altered light 24 is focused to project 26 from projector 10 to a desired image plane 28 as well as various control buttons such as rear control 30 so that can be configured as an on/off switch and/or joystick, and a scroll wheel 32 as may be used for display control. U.S. Pat. No. 6,954,236 provides an example of a silicon-on-sapphire display with wireless interconnect, this patent incorporated by reference herein. The operative couplings between elements 12, 16, 18, 30 and 32 are not shown in the figure for purposes of illustration clarity.

In projector 10, color information may be imparted on a broad-band (white light) source by passive filters, active control of an electrically tunable filter, mechanical filter color wheel, or by illumination with multiwavelength sources.

The light source used in projector 10 may be a standard incandescent or halogen light, miniature lasers (including semiconductor, solid-state or gaseous) or light emitting diodes (LEDs). Examples LEDs include white-light emitting LEDs, which have a broad emission spectrum including those that can be tuned to specific color temperatures. Additional light sources are LEDs emitting at one or more distinct wavelengths, with or without fluorescent coatings, as desired for the job at hand.

For example, to preserve night-vision, it may be desirable to use a red-light emitting LED to illuminate the display chip and project a monochrome red-hued image, thereby enabling a viewer to retain night-vision sensitivity. Another embodiment combines multiple wavelengths to product an effective while-light source, or uses LEDs to illuminate a phosphor or similar coating to produce emission at alternate wavelengths. As an alternatives to a color wheel, tunable filter or multi-colored filters applied to the chip, multiple Red-Green-Blue (RGB) LED's can be substituted and the chip can be time synchronized with LED selection for color rendition.

Data may be provided to display system 12 via a wireless transmission (RF or infrared). This could however be replaced with a permanent wired connection or a temporarily wired connection. Such information could be loaded into a non-volatile memory and stored for later display, for example.

Power supply 18 may include a direct connection to an external alternating current or direct current power supply or to a battery source within housing 14 as commonly practiced in the art. Another power supply alternative is to operably connect the micro-projector to micro-power devices such as microelectromechanical system (MEMS) energy generating device or as is described in U.S. Pat. No. 6,911,711 incorporated by reference herein.

The co-linear alignment of the single-panel liquid crystal display and the optical source substantially reduces the complexity of the optical system by eliminating dichromic prisms and numerous dichromic mirrors used with reflective displays or light-valves. This system simplification reduces the size, weight and cost of the system and improves its overall reliability. The sapphire based micro-displays disclosed herein, also operate at sufficient speed so that a single-panel operation may be used in this system configuration to produce a full-color image using time-sequential color. This eliminates the need for three-panel operation and the complexity of color-combining optics and packaging thereby providing for the portability of the apparatus.

Obviously, many modifications and variations are possible in light of the above description. It is therefore to be understood that within the scope of the claims, the invention may be practiced otherwise than as has been specifically described.

What is claimed is:

1. An hand-holdable light projector apparatus comprising:
   a portable housing;
   a light source disposed within said housing; and
   a light transmissive liquid crystal display (LCD) system positioned in said housing wherein light from said light source is passed through said light transmissive LCD system and is thereby selectively altered by said light transmissive LCD system, said selectively altered light projected from said housing, wherein said light from said light source and said light projected from said housing follows a substantially linear path within said housing.

2. The apparatus of claim 1 wherein said light transmissive LCD system includes a sapphire substrate.

3. The apparatus of claim 1 wherein said light source is chosen from the following group of light sources: incandescent light; halogen light; semiconductor laser; solid-state laser; gaseous laser; and light emitting diodes (LED)s.

4. The apparatus of claim 1 wherein said light source is chosen from the following group of light sources: white-light emitting LEDs and specific color tuned LEDs.

5. A hand-holdable projector apparatus comprising:
   a portable housing suitable for single-handed usage;
   a power supply disposed within said housing;
   a light source disposed within said housing, said light source operably coupled to said power supply;
   an optical assembly disposed within said housing to project light from said housing to an image plane;
   a light transmissive liquid crystal display (LCD) system operably coupled to said power supply and positioned in said housing between said light source and said optical assembly wherein light from said light source is passed through said light transmissive LCD system and is thereby selectively altered by said light transmissive LCD system, said selectively altered light projected from said housing by said optical assembly, wherein said light from said light source and said light projected from said housing follow a substantially linear path within said housing.

6. The apparatus of claim 5 wherein said light transmissive LCD system includes a sapphire substrate.

7. The apparatus of claim 5 wherein said light source is chosen from the following group of light sources: incandescent light; halogen light; semiconductor laser; solid-state laser; gaseous laser; and Light Emitting Diodes (LEDs).

8. The apparatus of claim 5 wherein said light source is chosen from the following group of light sources: white-light emitting LEDs and specific color tuned LEDs.

9. The apparatus of claim 5 wherein said power supply is chosen from the following group of power supply sources: alternating current power supply; direct current power supply; battery and micro-power device.

* * * * *